(12) United States Patent
Struik et al.

(10) Patent No.: US 8,681,993 B2
(45) Date of Patent: Mar. 25, 2014

(54) LOCAL AREA NETWORK

(75) Inventors: Marinus Struik, Toronto (CA); Scott Alexander Vanstone, Campbellville (CA)

(73) Assignee: Certicom Corp., Mississauga, Ontario (CA)

(*) Notice: Subject to any disclaimer, the term of this patent is extended or adjusted under 35 U.S.C. 154(b) by 546 days.

(21) Appl. No.: 12/390,030

(22) Filed: Feb. 20, 2009

(65) Prior Publication Data

US 2009/0296939 A1    Dec. 3, 2009

Related U.S. Application Data

(63) Continuation of application No. 10/383,572, filed on Mar. 10, 2003, now abandoned.

(60) Provisional application No. 60/362,865, filed on Mar. 8, 2002, provisional application No. 60/363,309, filed on Mar. 11, 2002.

(51) Int. Cl.
*H04L 9/08* (2006.01)

(52) U.S. Cl.
USPC ........... 380/278; 380/277; 713/156; 713/168; 713/171; 713/175; 709/204; 709/224; 709/225; 370/348; 370/401

(58) Field of Classification Search
USPC ......... 713/1, 2, 188, 194, 156, 168, 171, 175; 380/200, 201, 255, 277, 278; 726/2; 709/204, 224, 225; 370/348, 401
See application file for complete search history.

(56) References Cited

U.S. PATENT DOCUMENTS

| | | |
|---|---|---|
| 5,602,916 A | 2/1997 | Grube et al. |
| 6,456,599 B1 | 9/2002 | Elliott |
| 6,530,020 B1 | 3/2003 | Aoki |
| 6,606,706 B1 | 8/2003 | Li |
| 6,614,350 B1 | 9/2003 | Lunsford et al. |
| 6,801,998 B1 | 10/2004 | Hanna et al. |

(Continued)

FOREIGN PATENT DOCUMENTS

| | | |
|---|---|---|
| EP | 1102430 A1 | 5/2001 |
| WO | 95/12942 | 5/1995 |
| WO | WO 01/31836 A2 | 5/2001 |
| WO | 01/45437 | 6/2001 |

OTHER PUBLICATIONS

Venkatraman, L et al.; "A Novel Authentication scheme for Ad hoc Networks"; Proceedings of IEEE Wireless Communications and Networking Conference; Sep. 28, 2000; pp. 1268-1273; vol. 3; IEEE.

(Continued)

*Primary Examiner* — Aravind Moorthy
*Assistant Examiner* — Joseph Pan
(74) *Attorney, Agent, or Firm* — Fish & Richardson P.C.

(57) ABSTRACT

A method and system for distributed security for a plurality of devices in a communication network, each of the devices being responsible for generating, distributing and controlling its own keys for access to the communication network and using the keys to establish a trusted network, each device's membership to the communication network being checked periodically by other devices by using a challenge response protocol to establish which devices are allowed access to the communication network and the trusted network.

16 Claims, 4 Drawing Sheets

(56) References Cited

U.S. PATENT DOCUMENTS

| | | | |
|---|---|---|---|
| 6,842,460 | B1 | 1/2005 | Olkkonen et al. |
| 6,886,095 | B1 | 4/2005 | Hind et al. |
| 6,980,660 | B1* | 12/2005 | Hind et al. ............ 380/282 |
| 7,085,376 | B2 | 8/2006 | DiSanto et al. |
| 7,089,298 | B2 | 8/2006 | Nyman et al. |
| 7,127,613 | B2* | 10/2006 | Pabla et al. ............ 713/171 |
| 7,139,399 | B1 | 11/2006 | Zimmermann |
| 7,194,004 | B1* | 3/2007 | Thomsen ............ 370/401 |
| 2001/0034793 | A1 | 10/2001 | Madruga et al. |
| 2002/0018458 | A1* | 2/2002 | Aiello et al. ............ 370/348 |
| 2002/0019933 | A1 | 2/2002 | Friedman et al. |
| 2002/0051200 | A1 | 5/2002 | Chang et al. |
| 2002/0065695 | A1* | 5/2002 | Francoeur et al. ............ 705/7 |
| 2002/0132605 | A1 | 9/2002 | Smeets et al. |
| 2002/0143944 | A1 | 10/2002 | Traversat et al. |
| 2002/0150237 | A1 | 10/2002 | DiSanto et al. |
| 2002/0191572 | A1 | 12/2002 | Weinstein et al. |
| 2003/0055894 | A1* | 3/2003 | Yeager et al. ............ 709/204 |
| 2003/0056114 | A1 | 3/2003 | Goland |
| 2003/0149874 | A1* | 8/2003 | Balfanz et al. ............ 713/168 |
| 2003/0172271 | A1 | 9/2003 | Silvester |

OTHER PUBLICATIONS

Jacobs, S. et al.; "MANET Authentication Architecture"; IETF Internet Draft; Mar. 1999.

Zygmunt, J. et al.; "The Zone Routing Protocol (ZRP) for Ad Hoc Networks"; IETF Internet Draft; Nov. 1997.

Bond, M. et al.; "Decimalisation table attacks for PIN cracking"; Technical Report No. 560; Feb. 2003; University of Cambridge Computer Laboratory.

Lazaro, M.L.; International Search Report from corresponding PCT Application No. PCT/CA03/00315; Jul. 9, 2003.

Abdul-Rahman, A.; Halles, S.; "Distributed Trust Model"; Department of Computer Science, University College London; Gower Street, London, UK; retrieved Sep. 20, 2010 from http://portal.acm.org/citation.cfm?id=283739.

Candolina, C.; Kari, H.; "A security architecture for wireless ad hoc networks"; Proceedings of the IEEE Military Communications Conference; Oct. 7 to 10 , 2002, Anaheim, California; IEEE; ISBN: 978-0-7803-7625-0.

Lazaro, M.; Partial Search Report from corresponding European Application No. 10167434.9; search completed Sep. 24, 2010.

Haas, Zygmunt et al.; 'The Performance of Query Control Schemes for the Zone Routing Protocol', IEEE/ACM Transactions on Networking; vol. 9, No. 4; Aug. 1, 2001; pp. 427-438.

Office Action issued in Canadian Application No. 2,487,912 on Dec. 30, 2010; 2 pages.

Communication under Rule 71(3) EPC issued in European Application No. 03743773.8 on Feb. 25, 2010; 24 pages.

Extended European Search Report issued in European Application No. 10167434.9 on Jan. 28, 2011; 11 pages.

Yeager, J.Y., Chen, R.Y., "Trust Mechanism for a Peer-to-Peer Network Computing Platform," U.S. Appl. No. 60/308,932, filed Jul. 31, 2001, 167 pages.

Communication under Rule 71(3) EPC issued in European Application No. 10167434.9 on Oct. 18, 2012; 24 pages.

Extended European Search Report issued in European Application No. 12156949.5 on Mar. 22, 2013; 5 pages.

* cited by examiner

|  | A B C D E F G H | | Key source: C | encryption/decryption permitted |  |
|---|---|---|---|---|---|
| Group 1' | x x x | | Key source: C | encryption/decryption permitted |  |
| Group 2' | x   x | | Key Source: D | decryption only |  |

Figure 2

|  | A B C D E F G H | | Key source | Action |
|---|---|---|---|---|
| Group 1' | x x x | | Key source: C | encryption/decryption |
| Group 2' | x   x | | Key Source: D | decryption |
| Group 3' |   x x | | Key source: A | encryption/decryption |

Figure 3

|  | A B C D E F G H | | Key source | A | D |
|---|---|---|---|---|---|
| Group 1' | x x x | | Key source: C | encryption/decryption |  |
| Group 2' | x x   x | | Key Source: G | encryption/decryption | decryption |
| Group 3' |     x x | | Key Source: E |  | decryption |

Figure 4

|  | A B C D E F G H | | Key source | A | D |
|---|---|---|---|---|---|
| Group 1 | x x x | | Key source: C | encryption/decryption |  |
| Group 2 | x   x $ x | | Key Source: G | encryption/decryption | decryption |
| Group 3' |     x x | | Key Source: E |  | decryption |

$: hidden node (`fly on the wall')

Figure 5

LOCAL AREA NETWORK

This application is a continuation of U.S. patent application Ser. No. 10/383,572 filed on Mar. 10, 2003 now abandoned, which claims priority from U.S. Provisional Application No. 60/362,865 filed on Mar. 8, 2002 and U.S. Provisional Application No. 60/363,309 filed Mar. 11, 2002 all of which are incorporated by reference.

BACKGROUND OF THE INVENTION

1. Field of the Invention

This invention relates to communication networks, more particularly it relates to security within these networks.

2. Description of the Prior Art

One of the most significant recent developments in wireless technologies is the emergence of wireless personal area networking. Wireless personal area networks WPANs™, use radio frequencies to transmit both voice and data) and are specified by standards such as IEEE standard 802.15 or 802.3 from the Institute of Electrical and Electronics Engineers Standards Association (IEEE-SA), among other specifications. The 802.15 specification is ideal for linking notebook computers, mobile phones, personal digital assistants (PDAs), digital cameras, and other handheld devices to do business at home, on the road, or in the office.

These wireless networks are formed by a number of devices joining and leaving the network in an ad hoc manner, hence such networks are known as ad hoc networks or piconets. Thus, the set of devices connected to the ad hoc network any given time may fluctuate, and so the topology of the network is dynamic. It is desirable to control access to the network and to provide a mechanism for establishing and maintaining security. Traditionally, security is established using a central device or a piconet controller (PNC) which controls access and distributes keys within the network. A drawback of this scheme is that each member of the network is required to trust the PNC.

Admission to the piconet is based on the outcome of the following protocols between the prospective joining device and the PNC of the piconet. The joining device and the PNC engage in a mutual entity authentication protocol based on pubic key or symmetric key techniques. The true device identity of both the joining device and the PNC is determined using this protocol. A link key can also be derived based on the authentic keys of both parties. Another protocol involves using authorization techniques between both devices, based on access control lists (ACLs). The Access Control Lists may be dynamically updated, similar to PDA functionality, where a determination is made whether an entity is added or removed from the ACL at entry. This determination may be made by an operator, such as a human operator. For devices that lack a user interface, this update mechanism may be invoked by an open enrollment period followed by a lock-up step, for example, which may be confirmed by a button push or be a simple re-set of the whole list. This may be performed by actuating a re-set or re-initialize button on the device.

Thus devices in the piconet fully depend on information provided by the PNC regarding which devices have been admitted to the piconet, since admission is based on communication between the PNC and a joining device only. If however an improper list of devices, DeviceList, in the piconet has been distributed by the PNC, either by error or maliciously, the security of the network is jeopardised. Each device has a short hand address, such as a local 8-bit ID, and a long hand address, such as a global 48-bit device ID. For example, in a piconet in which since all devices share a common broadcast key, the list of admitted devices to the piconet is L:=(local 8-bit device ID, global 48-bit device ID), then the failure to obtain the complete and authentic list of admitted devices has the following consequences:

'Fly on the wall' scenario:

If a device obtains an incomplete list: $L' \subset (L' \neq L)$ of admitted devices, all devices in the complementary set L\L' are 'invisible' to the device. Hence, the device might mistakenly think it is sharing secured information only with devices from the list L', whereas actually it is unknowingly sharing with other devices of the set L as well. This obviously violates sound security practice.

'Switchboard' scenario'.

If the binding between the local device ID and the global device ID is incorrectly received, for example if 2 entries are interchanged, a device might direct information to the improper device and so compromise the intended security. This property also holds in other settings where a key-generating party does not share complete and authentic information on the composition of the key-sharing group itself with the other members of this group. Therefore, these scenarios present a security model in which there is complete trust or a security model in which a device trusts no other device, however a hybrid model of these two models is possible.

Accordingly it is an object of the present invention to mitigate or obviate at least one of above-mentioned disadvantages.

SUMMARY OF THE INVENTION

In one of its aspects the invention provides a method of establishing and maintaining distributed security between a plurality of devices in an ad hoc network, the method having the steps of; associating each device with a unique device address;
  assigning to one of the devices a control function to control access to the network by other devices;
  each of the devices generating a public key for distribution to other devices; each of the devices authenticating itself periodically with the other devices in order to determine status of the other devices;
  arranging the devices into a plurality of trust groups, each group having a group key for distribution within the trust group;
  associating a trust level to each of the devices;
  each of the devices using the public key and the group key to perform key agreement in order to establish a secure communication channel with the other devices in the group;
  whereby each of the devices is responsible for its own security by generating, distributing its own keys to the other devices.

In another aspect, the invention provides a method of establishing and maintaining distributed security between one correspondent and another correspondent, the correspondents being members of different ad hoc networks and forming a group of communicating correspondents, the method having the steps of;
  associating the one correspondent and the other correspondent with unique device addresses;
  controlling access to the different ad hoc networks;
  each ad hoc network having a gateway and transferring traffic between the correspondents via the gateways;
  the one correspondent generating a public key for distribution to the other correspondent;

the one correspondent authenticating itself periodically with the other correspondent in order to determine status of the other correspondent;

determining a group key for distribution to the correspondents in accordance to the step of controlling access;

associating a trust level to each correspondent; each of the correspondents using the public key and the group key for performing key agreement in order to establish secure communication within the group;

whereby the one correspondent is responsible for its own security by generating, distributing its own keys to the other correspondent.

In yet another aspect, the invention provides a distributed security system for a plurality of devices in a network, each of the devices being responsible for generating, distributing and controlling its own keys for access to the network and using the keys to establish a trusted network, each device's membership to the network being checked periodically by other devices by using a challenge response protocol to establish which devices are allowed access to the network and the trusted network.

BRIEF DESCRIPTION OF THE DRAWINGS

These and other features of the preferred embodiments of the invention will become more apparent in the following detailed description in which reference is made to the appended drawings wherein

FIG. 2 is a group structure for a security model having different trust levels;

FIG. 3 is a group structure for a security model having different trust levels;

FIG. 4 is a group structure for a security model having different trust levels;

FIG. 5 is a group structure for a security model having different trust levels;

DETAILED DESCRIPTION OF THE PREFERRED EMBODIMENTS

Figure 1:
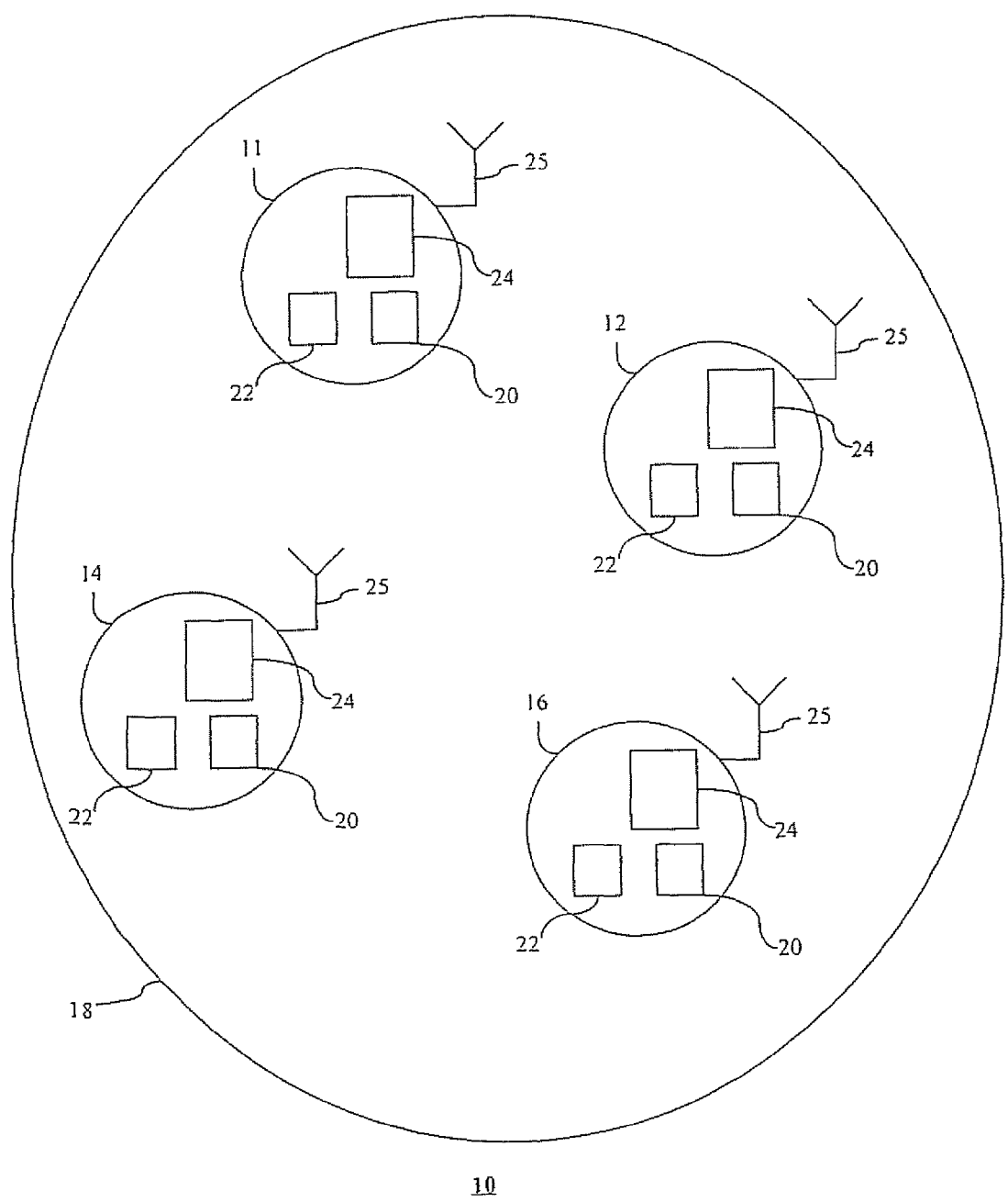
FIG. 1 is a communication network.

Reference is first made to FIG. 1, which shows an overview of a distributed security system 10 having a plurality of communication devices 11, 12, 14, 16 in a communication network 18, in a preferred embodiment. The communication network 18 may be a wireless personal area network (WPAN™) such as a piconet, in which the devices 11, 12, 14, 16 connect to each other in an ad hoc fashion. The devices 11, 12, 14, 16 may be portable and mobile computing devices such as PCs, Personal Digital Assistants (PDAs), peripherals, cell phones, pagers, consumer electronics, and other handheld devices. It will be understood that such devices 11, 12, 14, 16 include addressing information to facilitate communication within the network 18. The addressing information includes a local device ID, having 8 bits for example, and a device ID, such as, an IEEE MAC Address including 48 bits. Therefore, upon a device 11, 12, 14, 16 joining the network it is assigned an unused local ID. Generally, one device 11 will act as a master or a piconet network controller (PNC), and the other devices 12, 14, 16 act as slaves for the duration of the piconet 18 connection. The PNC 11 sets a clock, a hopping pattern determined by device ID, and assigns time for connections between all devices 11, 12, 14 16. Thus, each piconet 18 includes a unique hopping pattern/ID, and the PNC 11 gives slaves 12, 14 16 the clock and a local device ID, which is optionally used in conjunction with the EEE MAC Address, to form the piconet 18.

The PNC 11 activates an access controller 20 using ID's of the devices and optionally an access control list such that devices 12, 14, 16 that have been positively authenticated and have been authorized are admitted to the piconet 18. The PNC 11 also includes a traffic controller 22 to regulate data flow within the network 18. This may be done by allocating time slots to each device 11, 12, 14, 16 for message distribution. Each of the devices 11, 12, 14, 16 includes a security manager function 24. The security manager function 24 generates keys for communicating with other devices 11, 12, 14, 16 within the network 18, and distributes these keys to selected device members 11, 12, 14, 16 of the network 18. Each device 11, 12, 14 or 16 includes a transceiver 25 for establishing a communication channel with other devices 11, 12, 14, 16. When distributing a key, the security manager function 24 also indicates to the other devices 11, 12, 14, 16 in the network 18 the other devices 11, 12, 14, 16 to which the key is being distributed. Thus, there is no reliance on other devices 11, 12, 14, 16 for trust functionality, as each device 11, 12, 14 or 16 need only trust itself, to form a distributed security regime.

Thus, the security manager function 24 can establish a trust set, or TrustList, which indicates which of the devices 11, 12, 14, 16 in the network the security manager 24 of that particular device 11, 12, 14 or 16 is prepared to trust. The security manager function 24 may also attribute different levels of trust to each of the established trust sets. In this way the equivalent of a centralised network 18 can be established where a device 11, 12, 14 or 16 trusts every other device 11, 12, 14 or 16; or an entirely decentralised network 18 is provided where a device 11, 12, 14 or 16 trusts no other device 11, 12, 14 or 16 but itself.

Similarly the security manager 24 receiving a key from another device 11, 12, 14, 16 can determine its source and allocate to that key a level of trust that determines the functions for which the key will be used. Thus the security manager 24 may determine that the key is from a trusted party 11, 12, 14 or 16 and the key may be used to both decrypt messages received from that trusted party 11, 12, 14 or 16 and encrypt messages sent to that trusted party 11, 12, 14 or 16. Alternatively, the security manager function 24 may determine that the key originates at a party 11, 12, 14 or 16 not trusted by itself and only permit the key to be used for decryption. However, the device 11, 12, 14 or 16 may choose to ignore data, rather than going through the effort of having to decrypt the data first. This option may be useful for dealing with unsolicited communication or 'junkmail'.

The security manager 24 also includes methods of determining which of the devices 11, 12, 14 or 16 are presently active in the network 18. These methods include the functions of each device 11, 12, 14 or 16 re-authenticating itself with each of its key sharing parties 11, 12, 14 or 16 at predetermined time. One such method includes the steps or periodically performing a 'heartbeat operation' in the form of a challenge response protocol to determine which devices are presently included in the network 18, and adjusting the groups and trust levels accordingly. Thus, each device 11, 12, 14 or 16 may dynamically update its own TrustList to reflect changes in the trust relationships. For devices 11, 12, 14 or 16 that lack a user interface, this update mechanism may be invoked by an open enrollment period followed by a lock-up step, possibly confirmed by a button push, or it may be a simple re-set of the whole list, for example by pushing a re-set or re-initialize button on the device 11, 12, 14 or 16. Moreover, some of the changes might be invoked by a third entity that performs remote or delegated trust management for that device.

Referring now to FIG. 2, in order to describe the distributed security model, as an example, assume the PNC 11 permits access to devices A, B, C, D, E, F, G, H, then the DeviceSet:={A,B,C,D,E,F,G,H}. However if the device A only trusts devices A, B, C then TrustSet(A):={A, B, C} that is Group 1. Also, device A may participate in other groups having a different trust set, such as Group 2, having only device D. Thus the security manger function 24 of device A senses Group 1 and Group 2 with different constituent members and different levels of trust. For example, in Group 1, if device C is the key source, and since device C is part of the TrustSet(A), this key by device C is distributed which is used for both encryption/decryption permitted as C, and device A only accepts keys transferred to itself by devices DEV $\in$ TrustSet (A), for encryption and decryption purposes. In Group 2, as device D is not part of TrustSet(A), then A accepts a key from device D, and any other devices E, F, G and H, which are not part of TrustSet(A), for decryption purposes only. Accordingly if device A desires to communicate to Group 2 members, the device A generates a new group key to form a new group, Group 3, and device A distributes this new group key to the members of Group 2', that is device D. Therefore, the groups then under the control of the security manager of device A will then be Group 1, Group 2, as mentioned above, and Group 3, as shown FIG. 3.

The flexibility of the security managers 24 of devices A, B, C, D, F, F, G, H permits different network structures to be mimicked. For example, using the notation above, if DeviceSet:={A,B,C,D,E,F,G,H}, and TrustSet(A):=Universe, then device A can be considered an altruistic device which provides a structure equivalent to a centralized model. Conversely, if TrustSet(D):={D}, then device D is an egocentric device, and is a structure equivalent a completely decentralized model. Then, looking at FIG. 4, device A participates in Groups 1, 2 and 3, all groups having with differing trust relationships. For example, in Group 1 having devices A, B and C, if the key source is device C, then this group key is used for encryption and decryption, as device A trusts all devices B,C,D,E,F,G and H, which of course includes the key source C. However, in Group 2 having devices A, D, and G, with the key source being device G, once again device A uses this group key is used for encryption and decryption, while device D uses it for decryption only as it does not trust any other device A,B,C,E,F,G or H. In Group 3 having devices D and E, with the key source being device E, device D uses the group key for decryption only as it does not trust device E. As device A is not included in Group 3, it does not receive the key.

In FIG. 5, where one of the device F is hidden from the other members in the network 18, then Group 2 does not include the full list of member devices, A,D,G and H. Therefore, device D can not communicate with device F as the heartbeat operation will indicate that device D is not alive. Since the 8-bit address or the 48-bit address of device is unavailable, there is no communication between D and device F. Therefore, device D uses the group keys for decryption only.

Thus, these different group structures as shown in FIGS. 2, 3, 4 and 5 may be established within the same network 18 by using a decentralised or distributed security management scheme having the ability to set different levels of trust per device. This may be used in a number of ways, such as admission of devices A, B, C, D, E, F, G and H, such as PDAs to a piconet 18 based on different subscription models. For example, one subscription model may include charging a fee for airtime/bandwidth fee, while another model may be based on charging for content. In this example, the models may be implemented in a building, such as an airport or fitness club, the network 18 includes a fixed PNC 11 on a ceiling and the PNC 11 multicasting to subscribing devices only, or the models may be implemented between individual devices. Thus, by separating the role of the security manager 24 from that of the PNC 11, charging models that differentiate between airtime/bandwidth cost and content/subscription cost are possible, as these charging models might be operated by different entitles A,B,C,D,E,F,G or H, or another intermediate entity.

Figure 6:
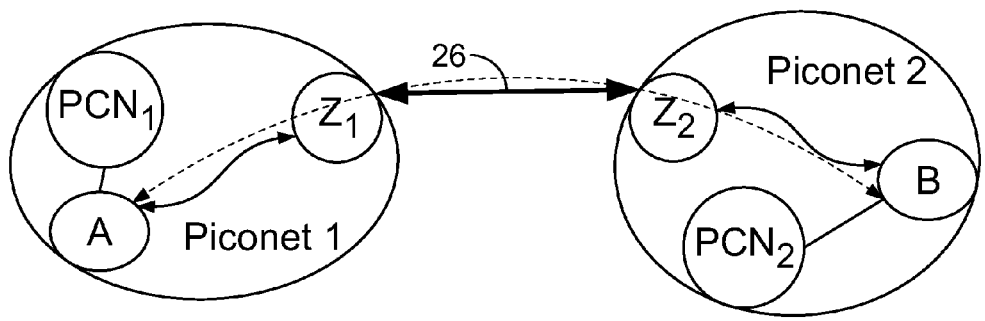
FIG. 6 shows communication between piconets.

It will be seen therefore that a versatile network 18 is provided, and moreover the removal of a device A,B,C,D,E, F,G or H from the network 18 does not require re-establishment of all keys in the network 18 as the individual devices A,B,C,D,E,F,G or H control the distribution of the keys. FIG. 6 shows communication between a device A in piconet 1 with another device B in piconet 2, where $Z_1$ and $Z_2$ are members of piconet 1 and piconet 2, respectively. $Z_1$ and $Z_2$ include transceivers 25 for establishing a communication channel or relay channel 26 between piconet 1 and piconet 2. Thus, $Z_1$ listens in on all traffic and sends all traffic destined for device B to $Z_2$ via the relay channel 26. Upon receipt of the traffic relayed by $Z_1$, $Z_2$ further broadcasts this traffic to B. $Z_1$ and $Z_2$ include WPAN functionality and may act as data relay agents only, and thus may not process data. Piconet 1 and piconet 2 include respective $PNC_1$ and $PNC_2$ and thus devices A and B only need $PNC_1$ and $PNC_2$, respectively, for allocation of time slots, and the function of protection of content is performed by the security manager 24 of each device A, B.

In order to facilitate communication between devices A and B, in different piconets 1 and 2, device A is associated with a router 28 which stores information related to other devices in its piconet 1, and routing information having instructions on how to route traffic from device A to other devices, such as device B. Correspondingly, device B is also associated with a router 30 having similar functionalities. Thus, any device A or B is associated with a router and these routers 28, 30 query each other periodically in order to update router information, due to the dynamic nature of the ad hoc networks 18.

Figure 7:
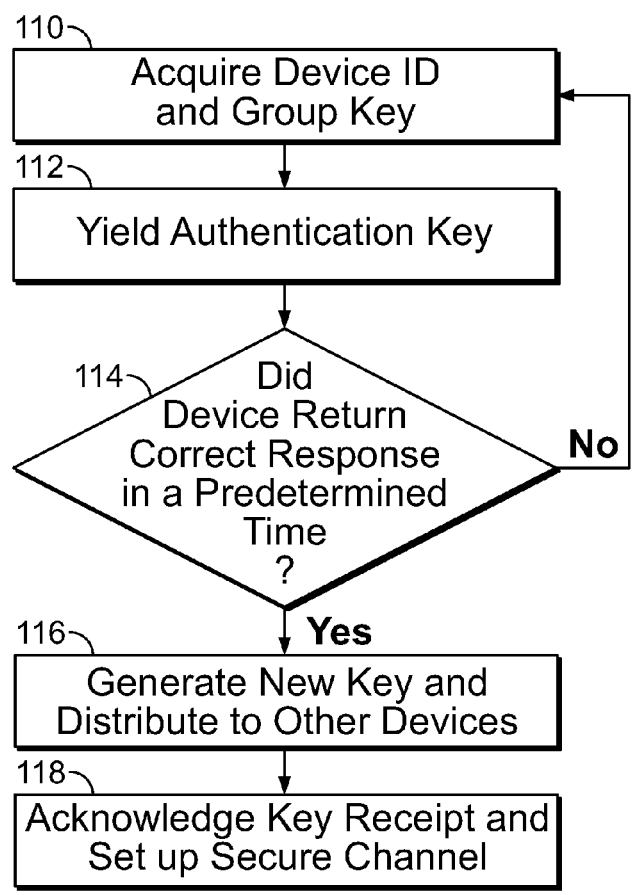
FIG. 7 shows a flowchart outlining steps for establishing secure communication between devices in different piconets.
Figure 8:
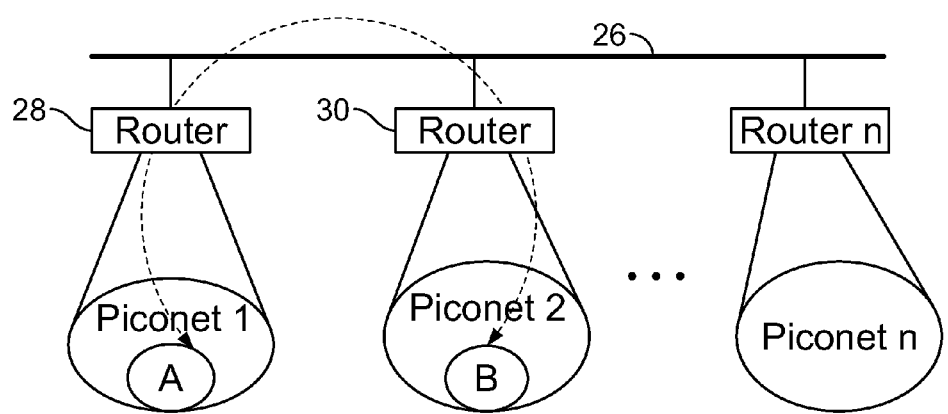
FIG. 8 shows secure communication between piconets.

Referring to FIG. 7 and FIG. 8, in order to establish a secure communication between device A and B, device A performs the steps of acquiring device B's full static address or device ID and a public key or symmetric key in order to perform key agreement, in step 110. In the next step 112, the key agreement yields an authentication key for subsequent communication. Once device A receives a response, in predetermined time, that proves possession of the group public key, in step 114, then device A generates a new set of group keys and transports these keys to device B, in step 116. Device 8 can then acknowledge receipt of group keys in step 118. Thus, devices A and B require each other's authentic public key and each other's full device ID for authentication and establishment of a secure channel 26, as different piconets may use different short hand address addresses for each device A or B. Therefore, device A and device B form a trusted group and a secure channel is set up, if device B trusts any of the intermediate routers, otherwise device B creates its own keys in order to set up a secure channel 26

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A method performed by a first communication device in an ad-hoc network, the method comprising:
    the first communication device identifying a first trust group associated with a first level of trust, the first trust group including a first subset of communication devices in the ad-hoc network;
    the first communication device identifying a second trust group associated with a second, lower level of trust, the second trust group including a second subset of communication devices in the ad-hoc network;
    the first communication device receiving, from a second communication device in the first trust group, a first cryptographic group key generated by the second communication device;
    the first communication device receiving, from a third communication device in the second trust group, a second cryptographic group key generated by the third communication device;
    based on the first level of trust associated with the first trust group, the first communication device designating the first cryptographic group key to be used for both encrypting and decrypting communications with the second communication device; and
    based on the second, lower level of trust associated with the second trust group, the first communication device designating the second cryptographic group key not to be used for encrypting communications with the third communication device.

2. The method according to claim 1, wherein the ad-hoc network includes a master device configured to activate an access controller using identifiers of devices in the ad-hoc network.

3. The method according to claim 2, wherein the master device uses an access control list to admit only devices that have been positively authenticated to the ad-hoc network.

4. The method according to claim 2, wherein the master device further comprises a traffic controller to regulate data flow within the ad-hoc network.

5. The method according to claim 4, wherein the master device allocates a time slot to each of the devices for message distribution.

6. The method according to claim 1, further comprising the first communication device determining which other devices are presently active in the ad-hoc network.

7. The method according to claim 6, wherein the determining comprises re-authenticating each of the other devices at a predetermined time.

8. The method according to claim 7, wherein the re-authenticating comprises performing a challenge-response protocol with each of the other devices to determine which of the other devices are present in the ad-hoc network.

9. A communication device comprising a processor and memory, the memory comprising computer executable instructions that when executed by the processor, perform operations for communicating in an ad-hoc network, the operations comprising:
    identifying a first trust group associated with a first level of trust, the first trust group including a first subset of communication devices in the ad-hoc network;
    identifying a second trust group associated with a second, lower level of trust, the second trust group including a second subset of communication devices in the ad-hoc network;
    receiving, from a second communication device in the first trust group, a first cryptographic group key generated by the second communication device;
    receiving, from a third communication device in the second trust group, a second cryptographic group key generated by the third communication device;
    based on the first level of trust associated with the first trust group, designating the first cryptographic group key to be used for both encrypting and decrypting communications with the second communication device; and
    based on the second, lower level of trust associated with the second trust group, designating the second cryptographic group key not to be used for encrypting communications with the third communication device.

10. The communication device according to claim 9, wherein the ad-hoc network comprises a master device configured to activate an access controller using identifiers of devices in the ad-hoc network.

11. The communication device according to claim 10, wherein the master device uses an access control list to admit only devices that have been positively authenticated to the ad-hoc network.

12. The communication device according to claim 10, wherein the master device further comprises a traffic controller to regulate data flow within the ad-hoc network.

13. The communication device according to claim 12, wherein the master device allocates a time slot to each of the devices for message distribution.

14. The communication device according to claim 9, the operations further comprising determining which other devices are presently active in the ad-hoc network.

15. The communication device according to claim 14, wherein the determining comprises re-authenticating each of the other devices at a predetermined time.

16. The communication device according to claim 15, wherein the re-authenticating comprises performing a challenge-response protocol with each of the other devices to determine which of the other devices are presently included in the ad-hoc network.

* * * * *

UNITED STATES PATENT AND TRADEMARK OFFICE
CERTIFICATE OF CORRECTION

| | |
|---|---|
| PATENT NO. | : 8,681,993 B2 |
| APPLICATION NO. | : 12/390030 |
| DATED | : March 25, 2014 |
| INVENTOR(S) | : Struik et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 143 days.

Signed and Sealed this
Eleventh Day of August, 2015

Michelle K. Lee
*Director of the United States Patent and Trademark Office*